United States Patent Office 3,239,791
Patented Mar. 8, 1966

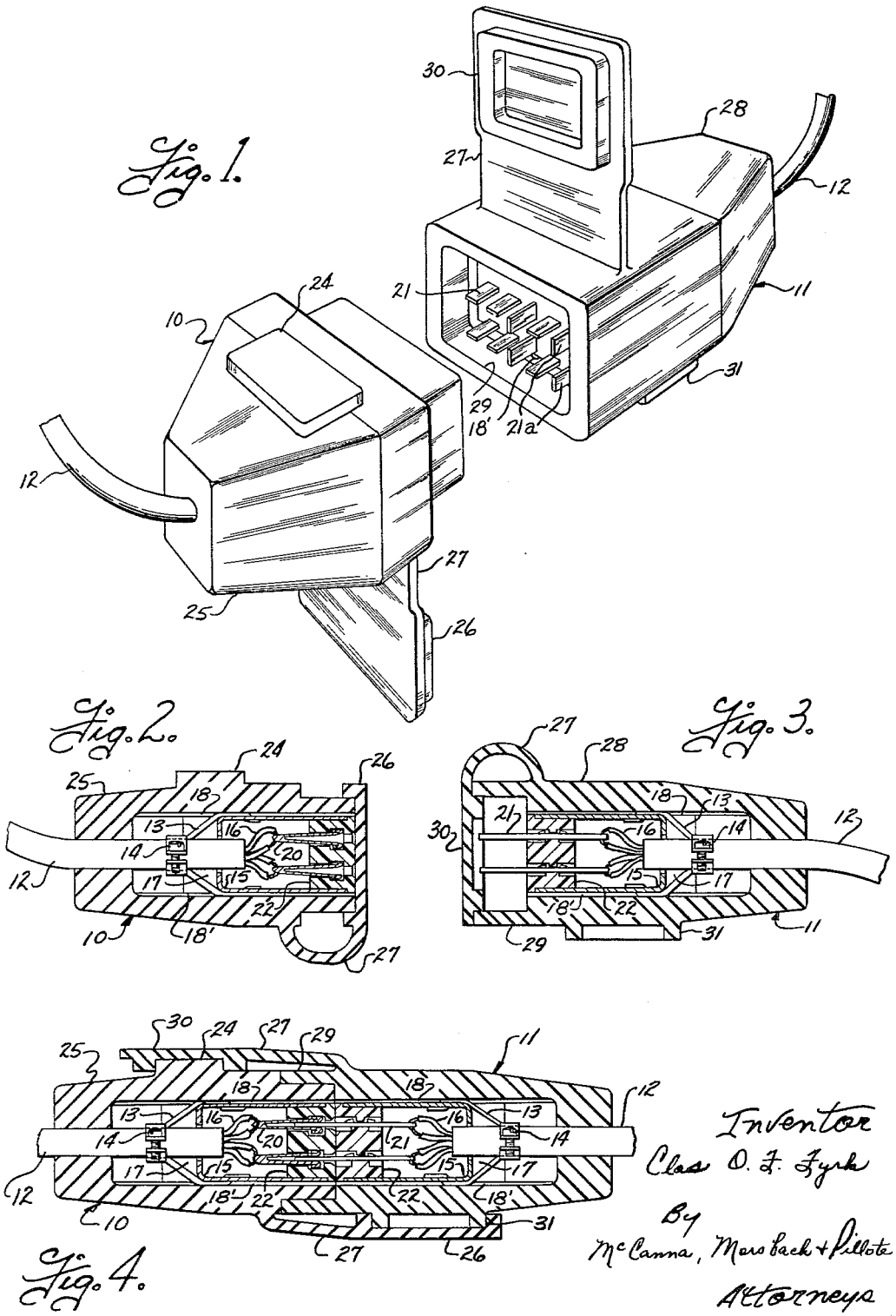

3,239,791
ELECTRICAL DISCONNECT COUPLING
Clas O. F. Fyrk, R.R. 4, Box 225, Rockford, Ill.
Filed Dec. 17, 1964, Ser. No. 419,025
8 Claims. (Cl. 339—44)

This invention relates generally to an electrical disconnect coupling.

The general object of this invention is to provide a disconnect coupling which includes an apparatus for covering the exposed electrical elements or the exposed connector face of the coupling when in disconnect position.

Another object of this invention is to provide a disconnect coupling which may be readily disconnected including an apparatus for retaining the electrical elements in interconnecting relationship.

Another object is to provide a disconnect coupling with an apparatus for covering the electrical elements or connecting face of the coupling when in disconnect position and including an apparatus for storing the cover apparatus in a soil-resisting manner when the elements are in interconnecting relationship.

A further object of this invention is to provide a disconnect coupling having a plurality of electrical elements, the coupling being constructed so that in a connecting operation the proper polarized relation between the connected elements is suggested by an apparatus on the cover of the coupling.

Still another object is to provide a disconnect coupling, the parts of which may be easily assembled and disassembled, and including a first and second apparatus on generally opposite sides of the coupling to provide a symmetrical retention of the assembled relationship.

A still further object of this invention is to provide a protective covering for an electrical disconnect coupling, said covering including apparatus in accordance with one or more of the aforementioned objects.

Other objects and advantages will become apparent from the following description taken in connection with the accompanying drawing in which:

FIGURE 1 is a perspective view of a two-part disconnect coupling embodying the features of the invention and illustrated in disconnect position;

FIG. 2 is a longitudinal sectional view of the left hand or socket member of the coupling when disconnected and having a cover apparatus overlying its connecting face;

FIG. 3 is a longitudinal sectional view of the right hand or plug member of the coupling when separated and having a cover member overlying the elements and its connecting face; and FIG. 4 is a longitudinal sectional view of the coupling when in interconnecting relationship and illustrating a manner for retaining the parts in said relationship.

A disconnect coupling embodying the features of this invention is particularly adapted for use where one or the other of the coupling members is disconnected for any period of time and especially under conditions where dust, grit, excessive moisture, or the like could adversely affect the electrical elements and inhibit their utility. The coupling is of a type adapted for use with an electrical conduit having a plurality of conductors therein, and the two parts of the connector are such that they can be assembled only in a way that provides proper polarized relation between the electrical elements and the respective coupling members; however, such is not required and this invention may be used with an ordinary two-pronged reversible connector member or a single element connector. The present coupling is particularly adapted for use on motor vehicles where an extension of an electrical line or lines is desirable; for example, as with a trailer or with an attachable electrical implement or other attachment. Under such circumstances, where it is desirable to keep the interconnected coupling free from dirt, grit, and the like, or to keep either of the disconnected members clean, a coupling of the present invention is particularly useful. Its use is not limited to motor vehicles, however, and it is contemplated that there is great utility for use in other outdoor connectors and also in other areas where dirt, grit, and the like are problems such as factories.

While the coupling is illustrated as being made of two members adapted to be assembled together, either one of the members may be used with a suitable constructed terminal structure similar in character to the other member embodied in a piece of electrical apparatus or otherwise mounted. Thus, if a connection between cables is to be made, the two parts of the coupling shown in the drawing are utilized. However, in some instances it may be desirable to embody one of these members as a terminal structure in an electrical appliance such as a motor, so that the cable connection is made directly to the appliance.

For purposes of illustration, the reference numeral 10 indicates the left hand connector member which is conveniently in the form of a socket member, while the numeral 11 indicates the right hand connector member, which is conveniently in the form of a plug member. By way of illustration and not limitation, the type of cable with which the coupling is illustrated as being used herein is shown as a ten-wire cable 12 with the wires 16 in side by side relation to each other, each of course being provided with proper insulating and protective covering with the outer layers of such covering holding the wires together as a single cable. While such form of cable is herein shown for purposes of illustration, the coupling of course is not limited to this particular type of cable and may be utilized with a multiple of cables.

The connector member 10 is conveniently in the form of a metal shell 15 which is attached to the cable 12 by means of a clamp 13 and a screw or other connecting means 14. The cable wires 16 are conveniently connected to electrical elements disposed inside the metal shell 15. In the form illustrated, the electrical elements are in the form of socket members 20 disposed within the metal shell. An insulating body 22 closes the end of the metal shell and disposes the electrical elements in position. The connector member 10 has a protective covering 25 surrounding the aforedescribed metal shell and elements. The protective covering 25 has a cover member 26 adapted to fit over the connecting face of this connector member 10. The cover member 26 is conveniently attached to the protective covering 25 by means of a flexible arm 27. The protective covering, cover member, and flexible arm are preferably integrally formed of the same material, which may be rubber, or other suitable material, but it is contemplated that they may be separate portions and otherwise connected and may be fabricated out of different types of material. The protective covering 25 conveniently has an internal shoulder 17 against which the back side of the metal shell 15 will butt to position the shell. There are also upper and lower grooves 18 and 18' which provide convenient chutes for receiving the clamp 13 during assembly.

The connector member 11 in the form illustrated is similar to connector member 10 and similar parts have the same description and same reference number as indicated supra. The electrical element for connector member 11 is conveniently in the form of prongs 21 which will interfit with the socket members 20 of the opposite connector member. As illustrated, the prong members 21 are arranged so that they will interfit with the socket members 20 in only one position to provide proper interconnecting of the elements; however, it is contemplated that there may be uses where such is not required and other types and arrangements of interconnecting elements may be utilized. The protective covering 28, generally surrounding the other portions of connector member 11, is conveniently formed with an outwardly extending portion 29 surrounding the prong members 21. If the elements are not in the form of prongs 21, said portion 29 may be reduced in length or omitted. A cover 30 conveniently provides a closure for the opening formed by the outwardly extending portion 29. Said cover member is attached to the protective covering 28 by means of a flexible arm 27 similar to the flexible arm on the connector member 10.

It can be seen that either connector member 10 or connector member 11 may be generally closed by the self-contained cover member to resist grit, dust, moisture and the like when in disconnect position as best indicated in FIGS. 2 and 3. The cover members 26 and 30 are swingable out of the above described position, hereinafter sometimes referred to as the cover position, to expose the connecting faces and the elements for interconnection, as best illustrated in FIG. 1.

Referring now to FIG. 4, it can be seen that the elements are in interconnecting relationship and the faces, wherein the elements are disposed, are in generally contiguous relationship. It is contemplated that the coupling may be designed for interconnecting of the elements without necessitating contiguous faces. In the embodiment illustrated, the outwardly extending portion 29 of the protective covering 28 generally embraces the end of the protective covering 25 of the connecting member 10; however, such is not required and a generally dirt-proof relationship may be otherwise obtained. The connecting member 10 has a receiving member 24 which is designed and arranged for engaging the cover member 30 of the opposite connecting member 11 to releasably retain that cover member and to protect the cover face. As shown, the receiving member is in the form of an upstanding boss shaped generally complementary to the face of the cover member on the opposite connecting member. A receiving member 31, of similar utility, is arranged on connector member 11 to engage the cover member 26 of the opposite connector member 10 and releasably retain the same while protecting the cover face thereof. Receiving member 31 is shown with a hollow portion to save material, however, it may be in a form similar to the receiving member 24 or of any form other than an upstanding receiving portion or boss. Thus, it can be seen that the cover members of the opposite connector members may be engaged on the receiving members to conveniently retain the elements in interconnecting relationship. Note that the arm portions 27 conveniently operate as a connecting link between the attached cover member and the protective covering to which it is attached. In the embodiment illustrated, there are two cover members and two receiving members to hold the elements in interconnecting relationship and these members are preferably located on substantially opposite sides of the connecting members to symmetrically retain the interconnecting relationship. The receiving members 24 and 31 generally engage the overlying faces of the cover members 26 and 30 respectively to store them in a position generally free from dirt, grime and the like and thus provide a relatively clean surface when it is desired to cover the ends of the connector members as best indicated in FIGS. 2 and 3.

In the embodiment illustrated in FIG. 1, two end prongs 21a are turned 90° so that there is only one angular position for interconnecting the elements. It is conceived that the connector members may be utilized in an arrangement where any angular positioning is sufficient, for example, where only one circuit is involved; however, when several circuits are disposed in the connector members, such an arrangement as illustrated conveniently assures that the circuits will always be properly completed when the elements are interconnected. Under such circumstances, the relationship between a cover member, for example, cover member 30, and a receiving member on the opposite connector member, for example receiving member 24, conveniently suggests the proper angular positioning of the two connecting members for proper interconnecting of the elements. Simple knowledge that the cover member may engage the receiving member suggests that they should be aligned, and this in turn suggests the proper angular positioning for interconnecting relationship of the elements. The outstanding size of the cover member and receiving member makes this suggestion an obvious advantage over any special design, shape, or arrangement of the smaller prongs 21 so that they will fit into the socket in only one position.

From the foregoing description, it will be evident that I have provided a novel disconnect coupling which may be readily connected and disconnected, and in which a cover member or closure member is utilized to engage the opposite connector member to retain an interconnecting relationship. The disconnect coupling is arranged in such a manner that other advantages flow therefrom. While I have thus described and illustrated a disconnect coupling comprising two disconnectable members, the essential portions of either member may be embodied in a piece of electrical apparatus such as a motor to enable the other member to be connected thereto as a means for effecting the connection of the cable to such electrical apparatus. Thus, the description and illustration of the specific embodiment of the invention comprising two disconnectable members has been done by way of illustration and not limitation, and I do not wish to be limited except as required by the scope of the appended claims.

I claim:

1. A protective covering for an electrical disconnect coupling having first and second parts adaptable to be readily disconnected, each of said parts having a connecting face and having elements disposed therein for interconnecting with said elements of the other of said parts when the said connecting faces are placed in juxtaposition; said protective covering comprising, first and second housings each shaped for overlying the respective first and second parts of said coupling and for providing a generally open end portion whereby the elements may be interconnected and the connecting faces may be placed in juxtaposition, each of said housings shaped for receiving at least one electrical conduit at a point generally spaced from said open end portion, a cover member swingably mounted on one side of said first housing and integral therewith and having a face shaped for overlying said connecting face of said first coupling part in one position to provide a protective cover therefor when said coupling part is in disconnect position and movable out of said one position for allowing said connecting faces to be placed in juxtaposition and for interconnecting said elements, a receiving member attached to said one side of said second housing and integral therewith and shaped to lockingly engage said face of the cover member of the first portion when said elements are interconnected for providing soil resisting storage of the cover member and for aiding in retaining said interconnecting relationship.

2. The combination of claim 1 including a second cover member similarly shaped as the first said cover member and mounted on the generally opposite side of said second housing and integral therewith and a second receiving member attached to the generally opposite side of said first housing and integral therewith and shaped to lockingly engage said second cover member when said elements are interconnected for providing a symmetrical retention of said interconnecting relationship.

3. In combination an electrical disconnect coupling having contiguous faces and adaptable to be readily disconnected and comprising A. a plug member having prongs extending outwardly from the contiguous face thereof, B. a socket member having elements shaped for receiving and interconnecting with the prongs of the plug member when the contiguous faces of the members are in juxtaposition, C. a cover member having a face shaped for overlying in one position the contiguous face of the plug member and for providing a protective cover for the prongs, D. a receiving member attached to the socket member and shaped to lockingly engage the face of the cover member in a second position and substantially provide soil resistant storage therefor, and E. a flexible arm integral with the cover member and attached to the plug member and having a length approximating the distance between said point of attachment to the plug member and the receiving member on the socket member when the contiguous faces of the plug and socket members are in juxtaposition to retain the plug member in juxtaposition with the socket member when the face of the cover member is engaged to the receiving member.

4. The combination with claim 3 including

A. a second cover member having a face shaped for overlying the contiguous face of said socket member and for providing a protective cover for said elements in one position, B. a second receiving member attached to said plug member and shaped to lockingly engage the face of the second cover member in a second position and substantially provide soil resistant storage therefor, and C. a second flexible arm integral with the second cover member and attached to said socket member and having a length approximating the distance between said point of attachment to said socket member and the second receiving member on said plug member when said contiguous faces of said plug and socket members are in juxtaposition to retain said socket member in juxtaposition with said plug member when the second cover member is engaged to the second receiving member.

5. A protective covering for an electrical disconnect coupling adaptable to be readily disconnected and including a plug member having prongs extending outwardly from the face thereof and a socket member having elements disposed in the face thereof for receiving and interconnecting with said prongs when the faces are in juxtaposition, said protective covering comprising a generally cupular shaped first part having an open end for receiving said plug member and extending to a point substantially adjacent the extended ends of said prongs, a generally cupular shaped second part having an open end for receiving said socket member and extending to a point substantially adjacent said face thereof, a cover member integral with each first and second covering part and having a portion shaped to engage and overlie in one position the open end of each respective part to provide a closure therefor and movable out of said one position to allow said plug and socket members to be interconnected, said extending portion of said first covering part being circumjacent to said end of said second covering part when the members are interconnected, and a means attached to each first and second covering part and shaped to substantially engage said overlying portion of the cover member of the opposite part when the plug and socket members are interconnected to provide soil resisting storage therefor and aid in retaining said interconnected relationship.

6. In combination with an electrical disconnect coupling having first and second connector members adaptable to be readily disconnected, elements axially disposed in an end of said first connector member, elements axially disposed in an end of said second connector member for interconnecting in one angular position with said first connector member elements when said first and second connector members are in juxtaposition, a first cover member having a face shaped for substantially overlying in one position said end of said first connector member and for providing a protective cover for said elements disposed therein, a second cover member having a face shaped for substantially overlying in one position said end of said second connector member and for providing a protective cover for said elements disposed therein, a first and a second flexible arm integral with the respective first and second cover member and attached to the respective first and second connector member, said first and second flexible arms swingable for movement of the respective first and second cover members to a position away from said respective one position whereby said elements of the first and second connector members may be interconnected in said one angular position, said first and second cover members being movable to a second position extending along said second connector member and said first connector member respectively when said first and second connector members are interconnected, an upstanding boss on each said first and second connector member angularly positioned thereon for engagement with said respective cover member attached to the other connector member when said elements are interconnected in said one angular position to suggest said one angular position when said elements are being moved from a disconnect position to a position for interconnecting, each upstanding boss shaped for engaging the face of the cover member attached to the other connector member for providing soil resisting storage therefor and aiding in retaining said interconnecting relationship.

7. A protective covering for an electrical disconnect coupling having first and second parts adaptable to be readily disconnected and having elements disposed in the first part for interconnecting with elements disposed in the second part, said covering comprising a first and a second housing each having a substantially cupular shape providing a generally open end to receive one of the said coupling parts whereby the elements may be interconnected when said coupling parts are in juxtaposition, said first and second housings having at least one hole spaced from said open end to receive an electrical conduit, first and second cover members integral with the respective first and second housing and shaped for engaging the respective open end of said first and second housing in one position and to provide a protective cover over said elements in disconnect position, a first and a second flexible arm integral with a connecting the first cover member to the first housing and the second cover member to the second housing respectively, said flexible arms arranged for swinging said cover members out of said one position when disengaged from the respective end of the first and second housing, and a receiving member integral with each of said housings and shaped for engaging the cover member of the opposite housing when said elements are interconnected for retaining said interconnected relationship.

8. A protective covering for an electrical disconnect coupling including a plug member having prongs extending outwardly from the face thereof and a socket member having elements disposed in the face thereof for receiving and interconnecting in one angular position with said prongs, said protective covering comprising a first housing having sides defining an open end for receiving the plug member, said sides extending to a point substantially adjacent the extended ends of said prongs, a second housing having an open end for receiving the socket member and extending to a point substantially adjacent its face thereof, said extending sides of the first housing shaped to engage and surround the end of said second housing when the plug and socket members are interconnected to provide a soil resisting connection, a first cover member integral with the first housing and having a face shaped to engage and overlie the open end of the first housing in one position for providing a soil resisting closure therefor, a first arm connecting the first cover member to a side of the first housing and flexible for movement of the first cover member from said one position, a first upstanding boss angularly positioned on and integral with a side of said second housing and shaped for engaging the face of the first cover member when said elements are interconnected in said one angular position for providing soil resisting storage for the first cover member and aiding in retaining said interconnecting relationship, a second cover member integral with the second housing and having a face shaped to engage and overlie the open end of the second housing in one position for providing soil resisting storage therefor, a second arm connecting the second cover member to the second housing on a generally opposite side from said first upstanding boss and flexible for movement of the second cover member from its said one position, a second upstanding boss on said first housing on a generally opposite side from said connection of the first arm and shaped for engaging the face of the second cover member when said elements are interconnected for providing soil resisting storage therefor and for providing a symmetrical retention of said interconnected relationship.

References Cited by the Examiner

UNITED STATES PATENTS

| | | | |
|---|---|---|---|
| 1,034,910 | 8/1912 | Greenway | 339—39 X |
| 1,267,247 | 5/1918 | Meeker | 339—43 |
| 1,978,510 | 10/1934 | Spence | 339—36 |
| 2,299,206 | 10/1942 | Berg | 339—39 |
| 2,878,456 | 3/1959 | Cormier | 339—44 |
| 2,882,509 | 4/1959 | Archer et al. | 339—89 X |
| 3,146,051 | 8/1964 | Woofter et al. | 339—91 X |

FOREIGN PATENTS 1,062,304   7/1959   Germany.

JOSEPH D. SEERS, *Primary Examiner.*